US012333361B2

(12) United States Patent
Schmitz

(10) Patent No.: US 12,333,361 B2
(45) Date of Patent: Jun. 17, 2025

(54) SECURITY ELEMENT HAVING A MACHINE-READABLE CODE AND METHOD FOR CHECKING THE AUTHENTICITY THEREOF

(71) Applicant: Giesecke+Devrient Currency Technology GmbH, Munich (DE)

(72) Inventor: Christian Schmitz, Schliersee-Neuhaus (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/479,253

(22) Filed: Oct. 2, 2023

(65) Prior Publication Data

US 2024/0111982 A1   Apr. 4, 2024

(30) Foreign Application Priority Data

Oct. 4, 2022   (DE) ................ 10 2022 003 656.8

(51) Int. Cl.
*G06K 19/06* (2006.01)
*B42D 25/324* (2014.01)
(Continued)

(52) U.S. Cl.
CPC ..... *G06K 19/06028* (2013.01); *B42D 25/324* (2014.10); *B42D 25/364* (2014.10);
(Continued)

(58) Field of Classification Search
CPC ............ G06K 19/06028; B42D 25/324; B42D 25/364; B42D 25/369; B42D 25/382; B42D 25/355; B42D 25/351
See application file for complete search history.

(56) References Cited

U.S. PATENT DOCUMENTS

2013/0173484 A1* 7/2013 Wesby ................ G06K 7/1417
705/318
2023/0249488 A1   8/2023 Pfeiffer et al.

FOREIGN PATENT DOCUMENTS

DE   102014011663 A1   2/2016
DE   102016014230 A1   5/2018
(Continued)

OTHER PUBLICATIONS

German Search Report from Corresponding German Patent Application No. DE102022003656.8, Jun. 29, 2023.

*Primary Examiner* — Matthew Mikels
(74) *Attorney, Agent, or Firm* — Workman Nydegger

(57) ABSTRACT

The invention relates to a security element, preferably in the form of a security strip, security thread or security patch, having a machine-readable coding, which is based on substances absorbent in the infrared spectral range, wherein the machine-readable coding comprises first and second code areas, which are arranged spatially separated from one another. The substances absorbent in the infrared spectral range include at least one first substance, which is not detectable by means of magnetic field measurement, and at least one second substance, which is detectable by means of magnetic field measurement, wherein the at least one first substance is introduced into at least one of the first code areas and the second substance is introduced into at least one of the second code areas. A method is provided for checking the authenticity of such a security element.

15 Claims, 6 Drawing Sheets

(51) Int. Cl.
*B42D 25/355* (2014.01)
*B42D 25/364* (2014.01)
*B42D 25/369* (2014.01)
*B42D 25/382* (2014.01)

(52) U.S. Cl.
CPC ......... *B42D 25/369* (2014.10); *B42D 25/382* (2014.10); *B42D 25/355* (2014.10)

(56) References Cited

FOREIGN PATENT DOCUMENTS

| | | |
|---|---|---|
| DE | 102020004091 A1 | 1/2022 |
| DE | 102021000892 A1 | 8/2022 |
| EP | 2417207 B1 | 10/2015 |
| JP | 2018134842 A | 8/2018 |
| WO | 2021078407 A1 | 4/2021 |
| WO | 2022033653 A1 | 2/2022 |

\* cited by examiner

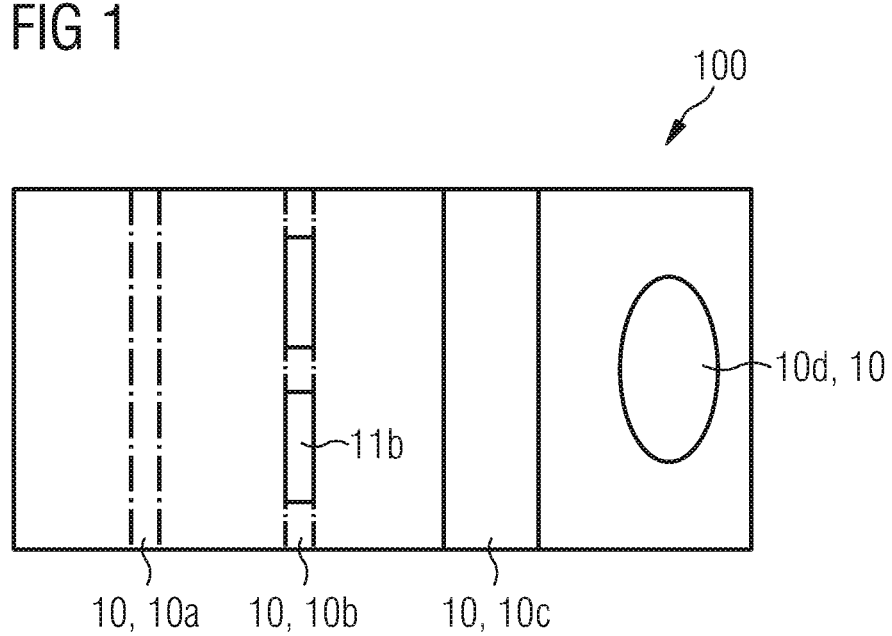

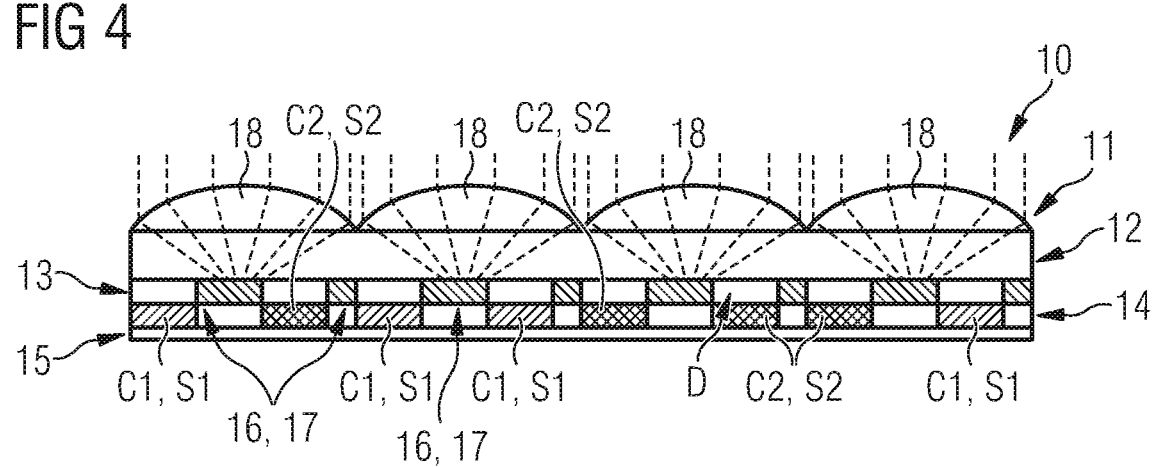
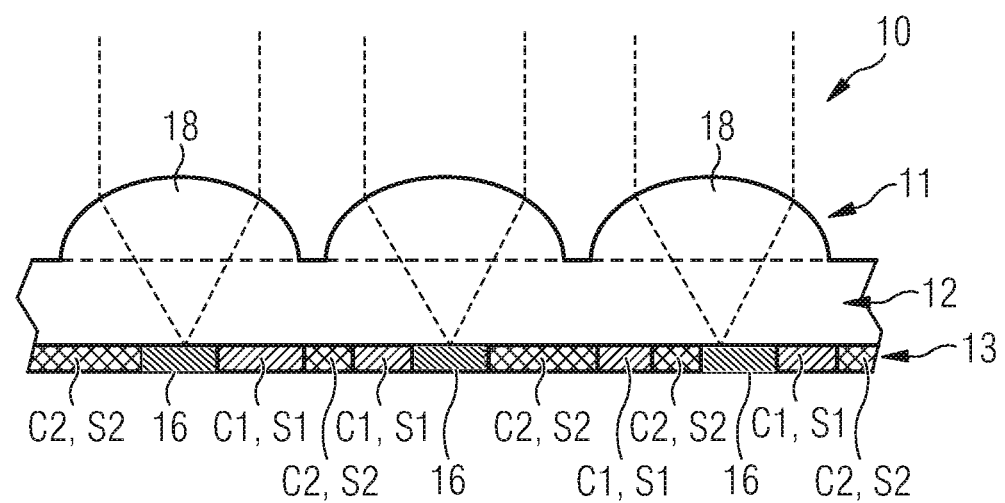

SECURITY ELEMENT HAVING A MACHINE-READABLE CODE AND METHOD FOR CHECKING THE AUTHENTICITY THEREOF

BACKGROUND

The present invention relates to a security element, preferably in the form of a film strip, film thread, or film patch, having a machine-readable code and a method for producing such a security element.

Value documents are typically provided with security elements to protect from forgeries, which security elements implement security features having properties verifiable visually and/or by machine, on the basis of which the authenticity of the value document can be checked. Various security features are known for this purpose in the prior art, which differ in particular with respect to the technical means using which the security feature is detectable or verifiable.

Visual security features having optically variable properties are of particular importance, in which the appearance of the visual security feature thus varies depending on the observation angle. In particular a tilt and/or movement effect can thus be visualized upon continuous change of the observation angle. Such security features are considered very secure from forgery, since the optically variable effect depending on the observation angle generally cannot be acquired by a forger with sufficient precision to simulate it. Moreover, such optically variable effects cannot be created by regular printing processes. Examples of optically variable security features are, for example, moiré magnifiers, tilt images, holograms, and thin-film elements.

The authenticity of value documents is to be checkable not only visually, but also by machine. The ability to check by machine offers a high level of security and is even absolutely required in many technical applications, for example, in banknote processing. Devices such as automatic counting machines and vending machines are to be able to identify denominations and/or check the authenticity of a banknote.

Known security threads and/or film elements having visual, in particular optically variable security features do not have effective machine readability. Providing such security elements with codes which are based on substances absorbent in the infrared is the only thing known from WO 2021/078407 A1.

Magnetic substances or printing inks having magnetic pigments, as known, for example, for intaglio printing or gravure printing from EP 2 417 207 B1, are generally well visible in incident light and also in transmitted light, so that they can interfere with the optical appearance of visual, in particular optically variable security features.

There is therefore a need for a security element having a machine-readable code, which is forgery proof and can be reliably checked for authenticity.

SUMMARY

The present invention achieves this object by way of the specified independent claims. Preferred embodiments of the invention are specified in the claims dependent thereon.

According to a first aspect of the present invention, a security element is provided, preferably in the form of a security strip (also: film strip), security thread (also: film thread), or security patch (also: film patch), having a machine-readable coding, which is based on substances absorbent in the infrared spectral range. The machine-readable coding comprises first and second code areas, which are arranged spatially separated from one another. The substances which are provided for the machine-readable coding according to the invention and are absorbent in the infrared spectral range comprise at least one first substance, which is not detectable by means of magnetic field measurement, and at least one second substance, which is detectable by means of magnetic field measurement. The at least one first substance is introduced into at least one of the first code areas and the second substance is introduced into at least one of the second code areas.

In other words, it is proposed that a magnetic coding be generated with the aid of different first and second substances, for example, corresponding printing inks, which comprises a magnetically detectable component (also magnetic coding) and a component detectable on the basis of the absorption behaviour in the infrared spectral range (IR) (also: IR coding).

In particular the wavelength range in a range from 400 nm to 700 nm is considered to be the optically visible wavelength range in conjunction with this disclosure. The wavelength range from at least 700 nm is designated in particular as the infrared range in the context of this description.

The first and second substances are introduced, for example, as pigments of printing inks in first and second code areas, for example, as part of a positive print or negative print, which are visible in a top view of the security element and represent a visually detectable security feature.

The first and/or second substances used preferably generate characteristic IR signatures, thus absorption spectra which can be used for the unambiguous assignment of the relevant first and/or second substance. For this purpose, in particular the spectral location of characteristic absorption maxima or minima can be checked, wherein first and/or second substances having broadband absorption are preferred.

The second substances used additionally generate signatures detectable by means of magnetic field measurement, which can be provided, for example, by magnetic or magnetizable pigments of corresponding printing inks, as are known, for example, from EP 2 417 207 B1.

A magnetic field measurement in the meaning of this description includes the determination of a magnetic field, a magnetic flux density, a magnetization, a remanence, a coercivity, and/or a hysteresis. For detection, magnetic properties of the second substances or their distribution are detected, for example, with the aid of routine magnetic sensors.

The first and/or second substances, the detection of which is at least partially based on the respective absorption behaviour in the infrared spectral range (IR), are preferably IR-absorbing pigments from SICPA (SICPA SA, AVE de Florian 41, 1008, Prilly, Switzerland), such as the printing inks sold under the tradename SICPATALK®.

The security element is preferably used to increase the difficulty in forging a value document. Value documents are to be understood in particular as banknotes, stocks, identification documents, credit cards, certificates, security cards, and in general documents which are in danger of forgery, provided with values, or associated documents, for example also product security elements such as labels and packages for high quality products or the like. The term "value document" in the context of this description comprises not only finished, negotiable value documents, but also precursors of such value documents, such as security papers, which do not have all features of a negotiable value document, for example, also security papers in sheet or roll form.

The security elements have, for example, film elements in the form of threads, strips, or patches, which are applied to a value document or are at least partially introduced into a value document, such as window security threads and pendulum security threads, which are used to cover continuous openings in a value document.

The detection or the checking of the magnetic coding includes the detection of the first and second substances in the first and second code areas on the basis of magnetic field measurements and checking the absorption behaviour in the infrared spectral range, for example, under IR illumination. The authenticity check of the security element, in particular with respect to a distribution of first and second substances in the first and second code areas, comprises, for example, the determination of absorption characteristics in the infrared spectral range. The authenticity check is at least partially based on a magnetic field measurement with respect to the distribution of the second substances in the second code areas.

The additional magnetic coding represents an increased difficulty in forgery in comparison to security elements having codes which are only based on substances absorbing in the infrared spectral range.

In preferred embodiments, at least one further second substance absorbing in the infrared, which is detectable by means of magnetic field measurement, is introduced into at least one of the second code areas. The at least one second substance and the at least one further second substance differ with respect to their magnetic properties, in particular with respect to the coercivity. The second code areas are formed, for example, by second substances which differ with respect to their magnetic coercivity and provide, for example, areas of low and/or high coercivity in the form of a magnetic coding.

In exemplary embodiments, two or more printing inks are used as second printing inks, the magnetic pigments of which differ with respect to their magnetic coercivity. In this case, the second code areas are characterized by areas having high magnetic coercivity and areas having low magnetic coercivity (so-called HiCoLoCo magnetic coding).

In preferred embodiments, it is provided that the at least one second substance and the at least one further second substance are overlaid or are introduced overlaid in at least one of the second code areas, in particular in the form of a mixture made up of the two substances. In this way, for example, a second code area can be formed, into which a combination of substances of different magnetic coercivity is introduced.

Preferably, the at least one first substance or one of the first substances is introduced as an IR-absorbing and magnetically nondetectable substance in each of the first code areas.

In preferred embodiments, the first and second code areas code information in the form of bits in the manner of a barcode, which enable, for example, a denomination identification in some embodiments.

In possible embodiments, the first and/or second code areas are arranged visually visible on the security element and form, for example, a visual security feature. The first, second, and/or further second substances are visually detectable in such embodiments and preferably create colour impressions corresponding to a chromatic colour.

In one refinement, an additional visually detectable coding is provided, which is based on at least one third substance that is transparent in the infrared spectral range and generates a visually detectable colour impression corresponding to a chromatic colour. The third substance is introduced into visibly arranged third code areas, which are arranged spatially separated from the first and second code areas. The third substance preferably does not contain any components which would be detectable by means of magnetic field measurement, so that the third code areas implement a further visually detectable security level, for example, as part of an optically variable security feature.

The first, second, and/or third code areas within the security element are preferably arranged overlaid with a micro-optical relief arrangement, in particular a microlens arrangement, of an optically variable security feature, in particular to protect the first and/or second code areas from mechanical abrasion.

Furthermore, the first, second, and/or third code areas are preferably arranged such that they can be imaged by the micro-optical relief arrangement, in particular by the microlens arrangement, as part of an optically variable security feature.

In possible embodiments, the second code areas, in which magnetically detectable second substances are introduced, are overlaid with an opaque ink layer, which is transparent in the infrared spectral range. In this manner, in particular the location of the second code areas can be concealed in the visual appearance and adequate machine readability can similarly be ensured.

In other embodiments, the first and/or second code areas are overlaid with a liquid crystal layer of an optically variable security feature. In exemplary embodiments, the liquid crystal layer has a colour tilt effect dependent on the observation angle in a manner known per se.

In such exemplary embodiments, the first and/or second code areas are preferably embedded in an opaque, in particular black cover ink layer, which is overlaid by the liquid crystal layer. The cover ink layer having the first and/or second code areas embedded therein preferably forms a dark background for the representation of the optically variable effect conveyed by the liquid crystal layer.

In embodiments alternative thereto, the first and second code areas are applied to a carrier layer bearing the cover ink layer, wherein the opaque, in particular black cover ink layer is overlaid by the liquid crystal layer.

Alternatively, the opaque, in particular black cover ink layer is overlaid by the liquid crystal layer, wherein the first code areas are embedded in the cover ink layer and the second code areas are arranged on a carrier layer, which bears the cover ink layer and on which the second code areas are applied.

In a method for checking the authenticity of a security element, in particular the above-described security element, an IR coding is determined on the basis of a detection of an absorption in the infrared spectral range, which coding is characterized by the distribution of the first and second substances in the first and second code areas. Furthermore, a magnetic coding is determined on the basis of a magnetic field measurement, which is characterized by the distribution of the second substances in the second code areas. The authenticity of the security element is checked on the basis of the detected IR coding and the magnetic coding in order to represent an increased difficulty in forgery.

BRIEF DESCRIPTION OF THE DRAWINGS

Further aspects, features, and advantages of the present invention will become clear on the basis of the following detailed description of preferred embodiments and embodiment variants with reference to the appended figures, in which:

FIG. 1 shows a value document having security elements according to possible embodiments of the invention in a top view;

FIG. 4 shows a security element having an optically variable security feature and a machine-readable coding according to a further possible embodiment of the invention in a schematic cross-sectional illustration;

FIG. 5 shows a further security element having an optically variable security feature in a schematic cross-sectional illustration;

DETAILED DESCRIPTION OF THE INVENTION

Figure 2A:
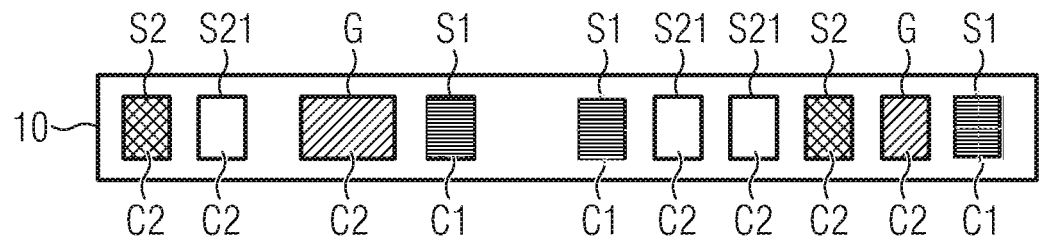
FIGS. 2a to 2c show a security element having a machine-readable coding according to a possible embodiment of the invention in a top view.

The invention will be explained by way of example hereinafter on the basis of the drawings, which illustrate specific exemplary embodiments of the invention. These exemplary embodiments are described in detail and enable the technical implementation of the invention by a person skilled in the art. The described embodiments do not mutually preclude one another, but rather supplement one another. A specific feature, a specific structure, or a specific property which is described in conjunction with one embodiment is thus also implementable in conjunction with other embodiments without deviating from the subject matter of the invention. Furthermore, the position or arrangement of individual elements or steps within the described embodiments obviously can be modified without deviating from the subject matter of the invention. Therefore, the following description of the appended figures is not to be understood as restrictive, because the scope of the invention is exclusively defined by the appended claims and also comprises variants and equivalents, which are not expressly described hereinafter.

FIG. 1 shows a schematic top view of a value document 100, which is provided with different security elements 10 that are preferably arranged in a defined location, in particular precisely registered, in relation to one another and with respect to the value document 100. Security elements 10 are shown which are embodied, for example, as a security thread 10a, window security thread 10b, security strip 10c, or security patch 10d. The value document 100 shown in FIG. 1 is, for example, a banknote having a substrate made of (cotton) paper, in which the security thread 10a is embedded. The value document 100 shown in FIG. 1 can also be a banknote having a polymer substrate, in particular based on polyethylene and/or polypropylene, or a film composite banknote.

The security thread 10b is a so-called window thread, which is embedded in the substrate of the value document 100 so that it alternately appears on opposite sides of the value document 100 in windows 11b.

FIG. 1 shows a plurality of different security elements 10, 10a, 10b, 10c, 10d, which do not necessarily have to be implemented in the entirety shown. It is apparent that even a single security element 10 can provide a sufficiently forgery-proof security feature for the value document 100. In preferred embodiments, multiple security elements 10, for example, an arbitrary combination of the security elements 10a, 10b, 10c, 10d shown in FIG. 1, can be provided to increase the security from forgery.

The security elements 10 are provided with a machine-readable coding, which is implemented by printing in code areas C1, C2, C3 by opaque printing inks introduced or applied therein at least in some areas. Exemplary embodiments of such security elements 10 are illustrated in FIGS. 2 and 3 in top views.

In the exemplary embodiments illustrated in FIGS. 2 and 3, in a top view, the machine-readable coding forms a single-colour or multicoloured pattern in the form of a barcode, which is based on first and second substances absorbent in the infrared spectral range (IR), for example, IR-absorbing pigments of corresponding printing inks, which are introduced or applied in first and second code areas C1, C2 of the security element 10.

The first and second code areas C1, C2 each form blocks on the visible side, which are arranged spatially separated from one another or are spaced apart from one another. The first code areas C1 are printed using a first substance S1, which is absorbent in the infrared spectral range and accordingly is detectable on the basis of its absorption behaviour in the infrared. The first substance S1 does not contain any magnetic or magnetizable components, however, which are detectable by means of magnetic field measurement, whereas second substances S2, which are introduced or applied in the second code areas C2, are detectable both on the basis of their absorption behaviour in the infrared spectral range and also on the basis of their magnetic properties by means of magnetic field measurement.

Figure 2B:
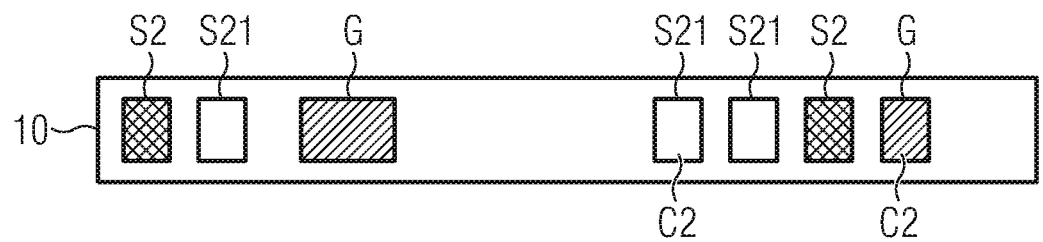
Figure 2C:
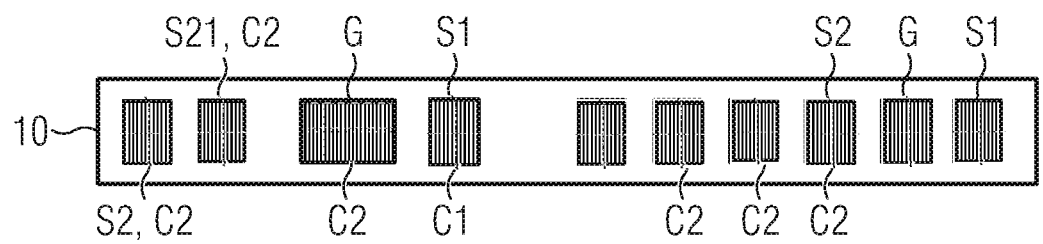

FIGS. 2a to 2c show an exemplary embodiment in which in addition a further, in particular magnetizable second substance S21 is provided, which is introduced into some of the second code areas C2. The further second substance S21 differs from the second substance S2 with respect to its magnetic properties. In the illustrated example, printing inks corresponding to two different types of magnetic pigments are used, which are introduced as second substances S2, S21 into the second code areas and differ with regard to their coercivity. The second substance S2 corresponds to a low coercivity or coercivity field strength, the further second substance S21 to a high coercivity or coercivity field strength. In other words, the second code areas S2, S21 code areas of high and low coercivity in the form of a so-called HiCoLoCo magnetic coding. In this case, the second substances S2, S21 are introduced in combination into some of the second code areas C2. These code areas C2 are accordingly printed using a mixture G made up of the second substances S2, S21 (second substance and further second substance) and accordingly code magnetically readable code areas.

FIG. 2a schematically illustrates an exemplary arrangement of first and second code areas C1, C2 in a top view of the security element 10, which is embodied, for example, as a security thread 10a, 10b. The code areas C1, C2 form a single colour or multicoloured pattern of blocks on the visible side. In particular to represent multicoloured motifs or symbols, it is provided that different first and/or second substances S1, S2, S21 are used, which have different colour pigments. For this purpose, in particular different nonmagnetic first substances S1 can also be provided, which correspond in the visually perceptible spectral range to different chromatic colours, for example, red, green, blue, white, and/or black.

FIG. 2b schematically shows the magnetic coding of the security element 10 of FIG. 2a during a magnetic field measurement. Since the first substance S1 or the first substances S1 do not have any magnetically detectable components, the correspondingly coded first code areas C1 do not contribute to the magnetically readable coding. The second code areas C2 are magnetically detectable in accordance with the areas of low or high coercivity or in accordance with combination areas, in which second substances S2, S21 having different magnetic coercivity are introduced.

FIG. 2b schematically illustrates a further security level in comparison to the visible arrangement of code areas C1, C2 shown in FIG. 2a, wherein the magnetically detectable second code areas C2 are distinguishable with respect to their magnetic properties, in particular their coercivity, and thus represent a component (also: magnetic coding) of a machine-readable coding.

FIG. 2c schematically illustrates the absorption behaviour of the security element 10 of FIG. 2a in a top view, for example, under illumination using infrared radiation. Since both the first and the second substances S1, S2, S21 are absorbent in the infrared spectral range (IR), all first and second code areas C1, C2 contribute to a further component (also: IR coding) of the machine-readable coding, which is detectable or verifiable on the basis of signatures in the IR absorption spectrum.

In embodiments in which multiple first substances S1 and/or second substances S2 and/or further second substances are provided, these can be distinguished in particular on the basis of their characteristic absorption behaviour in the infrared. This enables the design of security elements 10 having machine-readable codings which in particular, as illustrated in FIGS. 2a to 2c, for example, are correlated with one another on different security levels. In particular the design of multi-codes is enabled in this case, which accordingly provide a visually detectable coding (FIG. 2a), a coding detectable by means of magnetic field measurement (FIG. 2b), and a further coding (FIG. 2c), which is characterized by the absorption behaviour of the substances introduced into the code areas C1, C2.

For security elements 10, such as security threads 10a, 10b or security strips 10c, a machine-readable coding is provided on the basis of the magnetically readable second code areas C2, which are created according to one possible embodiment solely by a second substance having low magnetic coercivity (so-called LoCo coding, LoCo bits, or LoCo areas). Alternatively thereto, the second code areas C2 comprise those having low and/or high magnetic coercivity (so-called HiCo coding, HiCo bits, or HiCo areas) and/or having a combination of low and high coercivity, corresponding to a mixture G made up of second substances S2, S21 detectable by means of magnetic field measurement.

Preferably, at least one chromatic colour, which is provided by the magnetically nondetectable first substance S1, which is absorbent in the infrared, is integrated into the machine-readable coding. This chromatic colour is particularly preferably black. The magnetic coding is detectable and readable by means of magnetic field measurement or with the aid of routine magnetic sensors. Under infrared illumination, an overall code is detectable by means of infrared sensors, which is determined by the first and second code areas C1, C2, in which first and second substances S1, S2, S21, which are absorbent in the infrared spectral range, are introduced.

The machine-readable coding is provided, for example, in the form of printing of printing inks having magnetizable and non-magnetizable pigments, in particular as printing of printing inks corresponding to the substances S1, S2, S21, for example, on a plastic carrier of the security element 10, such as a polyethylene terephthalate (PET) film. Suitable printing inks are known, for example, from EP 2 417 207 B1.

In the embodiment shown in FIGS. 2a to 2c, the number of the visually visible first and second code areas C1, C2 (FIG. 2a) corresponds to the number of the code areas C1, C2 detectable on the basis of the absorption characteristic in the infrared (FIG. 2c).

In summary, a special embodiment shown in FIGS. 2a to 2c is such that the code areas C1, C2, C3 can be detected optically as code in daylight by means of sensors, while only the code area C2 is identified by means of magnetic field measurement and the two code areas C1 and C2 are identified under IR illumination.

Figure 3A:
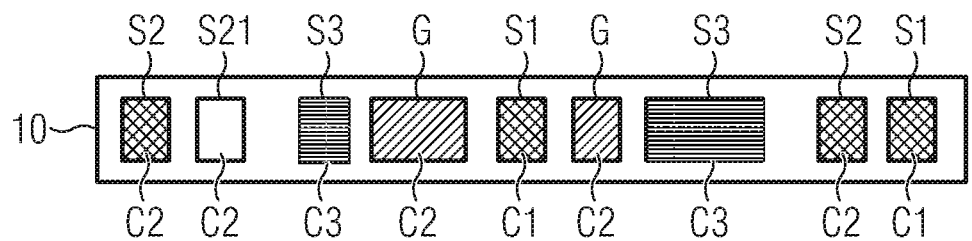
FIGS. 3a to 3c show a security element having a machine-readable coding according to a further possible embodiment of the invention in a top view.
Figure 3B:
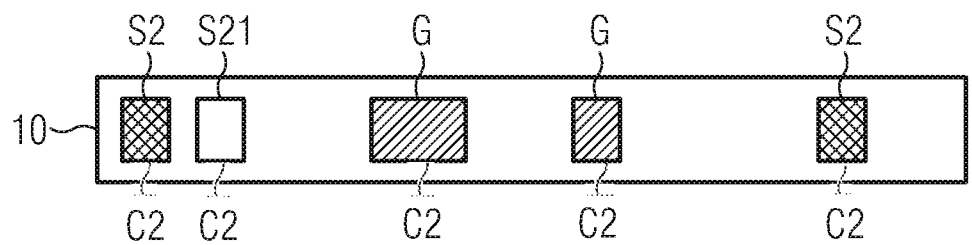
Figure 3C:
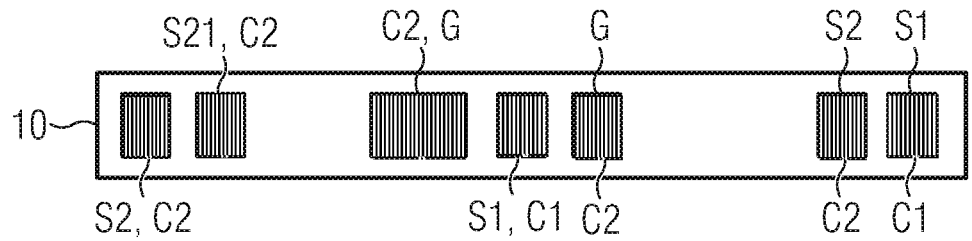

FIGS. 3a to 3c show a further exemplary embodiment which is substantially analogous to the embodiment shown in FIGS. 2a to 2c. In contrast to the embodiment shown in FIGS. 2a to 2c, the visually detectable coding, as illustrated in FIG. 3a in particular, is based on at least one further non-magnetizable third substance S3, which is transparent in the infrared spectral range and creates a visually detectable colour impression corresponding to a chromatic colour. For this purpose, the third substance S3 is introduced into visibly arranged third code areas C3 of the security element 10, which are arranged spatially separated from the first and second code areas C1, C2.

FIG. 3b schematically shows the magnetic coding of the security element 10 of FIG. 3a during a magnetic field measurement. Since the third substance S3 does not have a magnetically detectable component, the correspondingly coded third code areas C3 do not contribute to the magnetically readable coding. Furthermore, only the second code areas C2 are magnetically detectable, which in particular correspond to areas of low or high coercivity or combination areas, into which second substances S2, S21 of different magnetic coercivity are introduced.

FIG. 3c schematically illustrates the absorption behaviour of the security element 10 of FIG. 3a in a top view, for example, under illumination with infrared radiation. Since the third substance S3 is essentially transparent in the infrared spectral range (IR), the third code areas C3 do not contribute to the component of the machine-readable coding which is detectable or verifiable on the basis of signatures in the IR absorption spectrum. As is apparent in particular from the comparison to FIG. 3a, the number of the code areas C1, C2 detectable under infrared light does not correspond to the total number of the code areas C1, C2, C3.

The magnetically readable coding, which is provided by the second code areas C2, is detectable and readable by means of magnetic field measurement. The first and second code areas C1, C2 absorbent in the infrared can be detected and identified under infrared illumination. The third code areas C3 are not visible or not detectable under illumination with electromagnetic radiation in the infrared wavelength range. This enables the implementation of a machine-readable code, in particular for checking the authenticity of security elements 10, having a magnetically readable component and a component detectable on the basis of the IR absorption behaviour, wherein the corresponding components are determined by the distribution of the introduced or applied first, second, and/or third substances S1, S2, S21, S3.

The first, second, and/or third code areas C1, C2, C3 code information in the form of bits in exemplary embodiments, for example, for denomination identification of a banknote provided with the security element 10.

FIG. 4 shows a security element 10 in cross section, which comprises a visually detectable, optically variable security feature corresponding to a moiré magnifier. The security element 10 has a multilayer structure, wherein a micro-optic relief structure 11, which is provided in the embodiment shown by way of example by a microlens arrangement, forms the uppermost layer on the visible side or in a top view. The illustrated micro-optical relief structure 11 or microlens arrangement comprises a large number of microlenses 18, which are focused on underlying image elements 16 (also: micro-images). Upon observation through the micro-optical relief structure 11, the image elements 16 are magnified or optically changed in another manner in order to create the optically variable effect.

The moiré magnifier of FIG. 4 furthermore comprises a spacer layer 12, which is arranged between the relief structure 11 and an image layer 13 containing the image elements 16, as well as functional layers 14, 15. Machine-readable features in the form of the above-described first and second code areas C1, C2 are introduced into the functional layer 14. The further functional layer 15 consists, for example, of an adhesive layer for the intended application of the security element 10 to the value document 100. The image layer 13 consists in the illustrated embodiment of a translucent or transparent embossing lacquer, into which micro-depressions 17 are embossed. The micro-depressions 17 form the image elements 16 as so-called micro-images, which can be imaged by means of the optical relief structure 11 to create the optically variable effect.

The micro-lenses 18 and the image elements 16 each form a two-dimensional arrangement. The image layer 13 and the micro-optical relief structure 11 (microlens arrangement) create the optically variable security feature. The machine-readable coding contained in the functional layer 14 is based on first and second substances S1, S2 introduced therein, which are absorbent in the infrared spectral range. The second substances S2 are additionally detectable by means of magnetic field measurement, but the first substances S1 are not. Optionally, as illustrated in particular in the exemplary embodiment of FIG. 5, further third substances S3 are used for the coding, which are transparent in the infrared spectral range and are also not detectable by means of magnetic field measurement, and preferably correspond to chromatic colours of the visually perceptible spectral range.

For the microlens effect of the embodiment shown in FIG. 4, the image elements 16 that can be imaged are decisive and accordingly for the machine-readable coding, the distribution of the first, second, and possibly further second substances S1, S2, S21 in the first and second code areas C1, C2 is decisive. In optional embodiments, an opaque, in particular white ink layer D, which is transparent in the infrared, covers the second code areas C2, which are provided with magnetically verifiable second substances S2, S21, so that the magnetic coding preferably does not visually appear on the visible side. In variants of the illustrated exemplary embodiment, the first substance S1 is preferably transparent in the visible spectral range. The second substances S2, S21 preferably correspond to a light chromatic colour, particularly preferably the chromatic colour white.

FIG. 5 schematically shows the layered structure of a security element 10, in which the spacer layer 12 is formed by a carrier film made of polyethylene terephthalate. The micro-optical relief structure 11 of FIG. 5 forms a moiré magnifier for the image elements 16, wherein the machine-readable coding is integrated in the image layer 13 as code areas C1, C2.

Figure 6A:
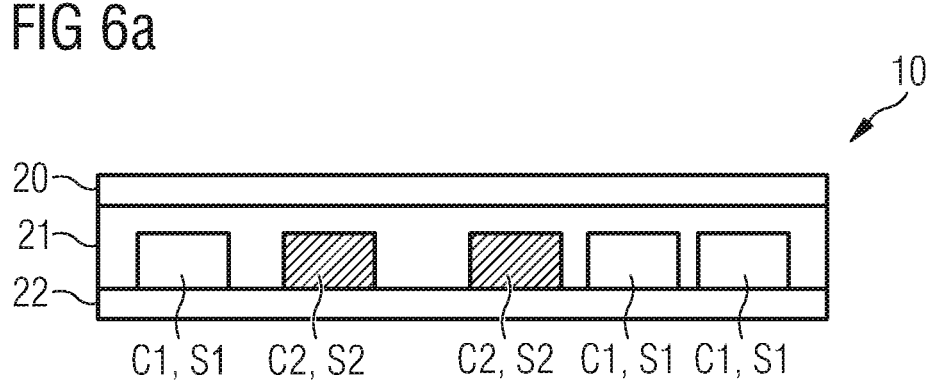
FIGS. 6a to 6c show exemplary embodiments of security elements having an optically variable security feature comprising a liquid crystal layer.
Figure 6B:
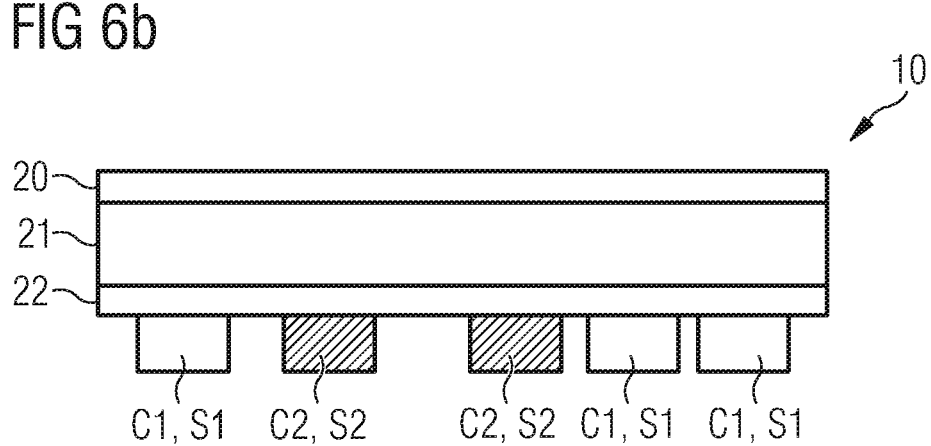
Figure 6C:
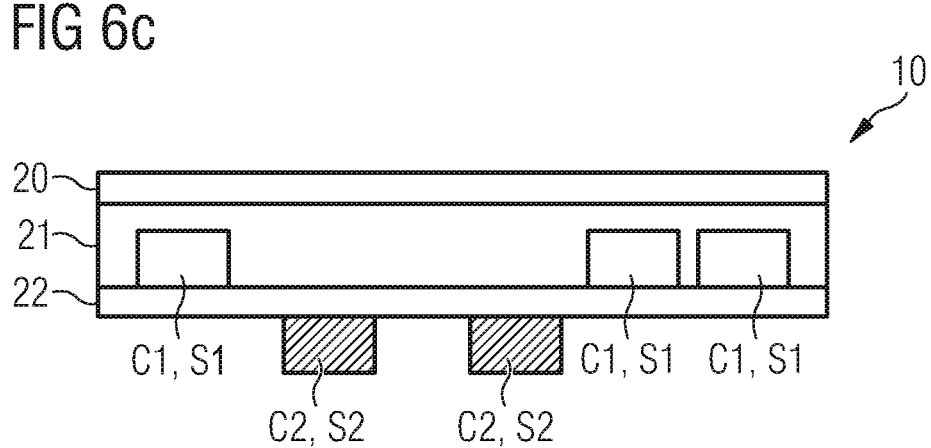

FIGS. 6a to 6c show further exemplary embodiments of security elements 10 having an optically variable security feature, which has a liquid crystal layer 20 that has a colour tilt effect upon change of the observation angle.

In the variant shown in FIG. 6a, the first and second code areas C1, C2 and accordingly the first and second substances S1, S2, S21 are embedded in an opaque, preferably black cover ink layer 21, which is applied to a carrier layer 22. The cover ink layer 21 is preferably embodied as the darkest possible background for the liquid crystal layer 20 and consists of an ink which is transparent in the infrared, so that the absorption behaviour of the code areas C1, C2 in the infrared is verifiable, for example, under IR illumination. The liquid crystal layer 20 can be created, for example, with the aid of a printing ink based on liquid-crystal pigments, wherein the liquid crystal layer 20 is transparent to electromagnetic radiation from the infrared spectral range.

FIG. 6b shows a variant of the exemplary embodiment illustrated in FIG. 6a, in which the second code areas C2, which are printed using magnetically detectable second and/or further second substances S2, S21, are arranged on a side of the carrier layer 22 facing away from the liquid crystal layer 20.

FIG. 6c shows a variant of the exemplary embodiment illustrated in FIG. 6a, in which the first and the second code areas C1, C2, which are printed using first and second substances S2, S21 absorbent in the infrared, are arranged on a side of the carrier layer 22 facing away from the liquid crystal layer 20.

Figure 7:
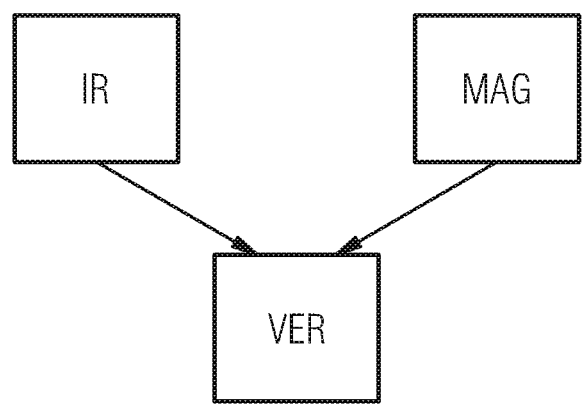
FIG. 7 schematically shows a method for checking the authenticity of one of the above-described security elements.

FIG. 7 illustrates a method for checking the authenticity of a security element 10.

At least one absorption measurement IR in the infrared spectral range and a magnetic field measurement MAG are provided for detecting the distribution of the first and second substances in the first and second code areas. The magnetic field measurement determines a magnetic coding, which is characterized by the distribution of the second substances S2, S21 in the second code areas C2. In addition, an IR coding, which is characterized by the distribution of the first and second substances S1, S2, S21 in the first and second code areas C1, C2, is determined on the basis of a detection of an absorption in the infrared spectral range. In a subsequent verification step VER, the authenticity is checked in consideration of the IR coding and the magnetic coding.

In each of the above examples, a spatial separation of the code areas is shown according to special embodiment variants. Alternatively, the code areas can also be arranged adjacent to one another (i.e., adjoining) or slightly overlapping, so that initially a larger bit is visually identified, which is later detected as a narrower bit by means of magnetic field measurement. Similarly, this would also apply in the case of a code having the various substances S1, S2, S21, and S3 under IR observation. It is also conceivable to arrange the coding C1 and C2 so that the bits of the substances S2 and S21 are located within the bits of the substance S1, thus the substances S2 and S21 are printed on the substance S1. Initially only the coding C1 is recognized optically and also under IR observation. The individual bits of the coding C1 are visually larger than the bits of the coding C2. The individual bits of the coding C2 do not necessarily have to be located centrally within the bits of the coding C1 here, but rather depending on size the bits of the coding C1 can be printed on at different positions. The substances S1 and/or S3 can also contain negative characters in the form of texts or motifs, which do not interfere with the coding C1 or C3 under IR observation, but are visually identifiable upon observation of the security element in transmitted light.

The invention is explained above by way of example on the basis of the drawings, which illustrate specific exemplary embodiments of the invention. These exemplary embodiments are described above in detail and enable a person skilled in the art to technically implement the invention. The described embodiments do not mutually preclude one another, but rather supplement one another. A specific feature, a specific structure, or a specific property which is described in conjunction with one embodiment is thus also implementable in conjunction with other embodiments without deviating from the subject matter of the invention. Furthermore, the position or arrangement of individual elements or steps within the described embodiments obviously can be modified without deviating from the subject matter of the invention. Therefore, the description of the appended figures is not to be understood as restrictive, because the scope of the invention is exclusively defined by the appended claims and also comprises variants and equivalents, which are not expressly described.

The invention claimed is:

1. A security element having a machine-readable coding, which is based on substances absorbent in an infrared spectral range,
   wherein the machine-readable coding comprises first and second code areas, which are arranged spatially separated from one another,
   wherein the substances absorbent in the infrared spectral range comprise at least one first substance, which is not detectable by means of magnetic field measurement, and at least one second substance, which is detectable by means of magnetic field measurement,
   wherein the at least one first substance is introduced into at least one of the first code areas and the at least one second substance is introduced into at least one of the second code areas.

2. The security element according to claim 1, wherein at least one further second substance, which is detectable by means of magnetic field measurement, is introduced into at least one of the second code areas, wherein the at least one second substance and the at least one further second substance differ with respect to their magnetic properties, in particular with respect to their coercivity.

3. The security element according to claim 2, wherein the at least one second substance and the at least one further second substance are introduced overlaid into at least one of the second code areas, in particular as a mixture.

4. The security element according to claim 1, wherein the at least one first substance or one of the first substances is introduced into each of the first code areas.

5. The security element according to claim 1, wherein the first and second code areas code information as bits in the manner of a barcode.

6. The security element according to claim 1, wherein the first and/or second code areas are arranged so they are visually visible and the first, second, and/or further second substances create visually detectable colour impressions corresponding to chromatic colours.

7. The security element according to claim 1, characterized by an additional visually detectable coding, which is based on at least one third substance, which is transparent in the infrared spectral range and creates a visually detectable colour impression corresponding to a chromatic colour, wherein the third substance is introduced into visibly arranged third code areas, which are arranged spatially separated from the first and second code areas.

8. The security element according to claim 1, wherein the first, second, and/or third code areas are arranged within the security element overlaid with a micro-optical relief arrangement, in particular by a microlens arrangement, of an optically variable security feature.

9. The security element according to claim 8, wherein the first, second, and/or third code areas are arranged such that they can be imaged by the micro-optical relief arrangement, in particular by the microlens arrangement, as part of an optically variable security feature.

10. The security element according to claim 1, wherein the second code areas are overlaid with an opaque ink layer, which is transparent in the infrared spectral range.

11. The security element according to claim 1, wherein the first and/or second code areas are overlaid with a liquid crystal layer of an optically variable security feature.

12. The security element according to claim 11, wherein the first and/or second code areas are embedded in an opaque, in particular black cover ink layer, which is overlaid with the liquid crystal layer.

13. The security element according to claim 11, characterized by an opaque, in particular black cover ink layer, which is overlaid with the liquid crystal layer, and a carrier layer bearing the cover ink layer, to which the first and second code areas are applied.

14. The security element according to claim 11, characterized by an opaque, in particular black cover ink layer, which is overlaid with the liquid crystal layer and in which the first code areas are embedded, and a carrier layer bearing the cover ink layer, to which the second code areas are applied.

15. A method for checking authenticity of a security element having a machine-readable coding, which is based on substances absorbent in an infrared spectral range, the machine-readable coding including first and second code areas, which are arranged spatially separated from one another, the substances absorbent in the infrared spectral range including at least one first substance, which is not detectable by means of magnetic field measurement, and at least one second substance, which is detectable by means of magnetic field measurement, the at least one first substance being introduced into at least one of the first code areas and the at least one second substance is introduced into at least one of the second code areas, the method comprising:
   determining an infrared coding based on a detection of an absorption in the infrared spectral range, which is characterized by the distribution of the first and second substances in the first and second code areas; and
   determining a magnetic coding based on a magnetic field measurement, which is characterized by distribution of the second substances in the second code areas,
   wherein the authenticity of the security element is checked based on the infrared coding and the magnetic coding.

* * * * *